(12) United States Patent
Oh

(10) Patent No.: US 10,007,358 B2
(45) Date of Patent: Jun. 26, 2018

(54) DISPLAY DEVICE

(71) Applicant: Samsung Display Co., Ltd., Yongin-si (KR)

(72) Inventor: Jeong Il Oh, Cheonan-si (KR)

(73) Assignee: Samsung Dispiay Co., Ltd., Yongin-si (KR)

( * ) Notice: Subject to any disclaimer, the term of this patent is extended or adjusted under 35 U.S.C. 154(b) by 68 days.

(21) Appl. No.: 15/005,491

(22) Filed: Jan. 25, 2016

(65) Prior Publication Data

US 2016/0321987 A1 Nov. 3, 2016

(30) Foreign Application Priority Data

Apr. 30, 2015 (KR) ........................ 10-2015-0061605

(51) Int. Cl.
*G09G 3/36* (2006.01)
*G06F 3/0354* (2013.01)
*G06F 3/041* (2006.01)
*G06F 3/042* (2006.01)
*G09G 3/3233* (2016.01)

(52) U.S. Cl.
CPC .......... *G06F 3/03542* (2013.01); *G06F 3/042* (2013.01); *G06F 3/0412* (2013.01); *G09G 3/3648* (2013.01); *G09G 3/3233* (2013.01); *G09G 2360/14* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,195,266 | A * | 3/1980 | Bingham | G06G 7/14 330/51 |
| 4,474,472 | A * | 10/1984 | Winter | G01N 15/0618 356/38 |
| 5,774,166 | A * | 6/1998 | Kazuyuki | G06K 15/1219 347/248 |
| 2003/0122749 | A1* | 7/2003 | Booth, Jr. | G09G 3/3208 345/82 |
| 2004/0012565 | A1* | 1/2004 | Cok | G06F 3/0412 345/158 |
| 2004/0183759 | A1* | 9/2004 | Stevenson | G02B 6/43 345/82 |
| 2006/0262055 | A1* | 11/2006 | Takahara | H04N 5/23293 345/81 |

(Continued)

FOREIGN PATENT DOCUMENTS

KR 20-1991-0013524 7/1991
KR 10-2007-0008056 1/2007
(Continued)

*Primary Examiner* — Van N Chow
(74) *Attorney, Agent, or Firm* — H.C. Park & Associates, PLC

(57) ABSTRACT

A display device includes: a display panel including a display area; scan lines disposed on the display panel; data lines disposed on the display panel, the data lines crossing the scan lines while being insulated from the scan lines; pixel units disposed in the display area and positioned at a point where the scan line intersects the data line; and photosensors respectively connected to the pixel units, each photosensor configured to activate a respective pixel units when laser light is incident on the photosensor.

9 Claims, 7 Drawing Sheets

(56) References Cited

U.S. PATENT DOCUMENTS

2011/0108711 A1* 5/2011 Tsupryk ............... G01N 21/645
250/214 R
2011/0316771 A1* 12/2011 Kume ................... G06F 3/0412
345/156

FOREIGN PATENT DOCUMENTS

| KR | 10-2008-0040845 | 5/2008 |
| KR | 10-2009-0076525 | 7/2009 |

* cited by examiner

DISPLAY DEVICE

CROSS-REFERENCE TO RELATED APPLICATION

This application claims priority from and the benefit of Korean Patent Application No. 10-2015-0061605, filed on Apr. 30, 2015, which is hereby incorporated by reference for all purposes as if fully set forth herein.

BACKGROUND

Field

Exemplary embodiments relate to a display device, and more particularly, to a flat panel display capable of identifying an indication region formed by a laser pointer and a control method thereof.

Discussion of the Background

When a display device displays an image using an organic light emitting diode (OLED), the OELDs may emit light based on an image signal to display an image.

When the display device is a liquid crystal display (LCD), a backlight unit, such as a light emitting diode (LED), generates light, and light generated from the backlight unit may be provided through a liquid crystal circuit disposed in front of the backlight unit to display an image.

When a laser pointer is used to indicate a specific point of an image displayed on the display device, a laser light from the laser pointer may be invisible on the display device. That is, a polarizer included in the display device or a light source of the display device may interfere with the laser light of the laser pointer. Consequently, the laser light radiated onto the display device may not be clearly visible or completely invisible.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a display device having advantages of clearly displaying a laser light radiated by a laser pointer on to the display device.

Additional aspects will be set forth in the detailed description which follows, and, in part, will be apparent from the disclosure, or may be learned by practice of the inventive concept.

An exemplary embodiment discloses a display device including: a display panel including a display area; scan lines disposed on the display panel; data lines disposed on the display panel, the data lines crossing the scan lines while being insulated from the scan lines; pixel units disposed in the display area and positioned at a point where the scan line intersects the data line; and photosensors respectively connected to the pixel units, each photosensor configured to activate a respective pixel units when laser light is incident on the photosensor.

Each photosensor may comprise a light sensing unit configured to transmit a sensor current in response to detecting the laser light, and the light sensing unit may comprise any one selected from the group consisting of a photoresistor, a photodiode, and a phototransistor.

The display device may further comprise a power line configured to provide a current to the pixel units. Each pixel unit may comprise: a first switching element comprising a gate electrode connected to the scan line, a source electrode, and a drain electrode; a second switching element comprising a gate electrode, a source electrode, and a drain electrode; and a light emitting element. The light sensing unit may comprise a first electrode connected to the power line and a second electrode connected to the light emitting element. The source electrode and the drain electrode of the first switching element may be respectively connected to the data line and the gate electrode of the second switching element. The source electrode and the drain electrode of the second switching element may be respectively connected to the power line and the light emitting element.

The photosensor may comprises: a light sensing unit configured to generate a sensor current in response to detecting the laser light is incident; and a resistance unit connected in parallel to the light sensing unit.

The pixel unit may comprise: a switching element comprising a gate electrode connected to the scan line, a source electrode, and a drain electrode is connected to the data line; a pixel electrode; and a common electrode. The resistance unit of the photosensor may be connected between the pixel electrode and the common electrode. The source electrode and the drain electrode of the switching element may be respectively connected to the data line and the pixel electrode of the pixel electrode.

The light sensing unit may comprise any one selected from the group consisting of a photoresistor, a photodiode, and a phototransistor.

The photosensors may comprise at least one photosensor connected to two adjacent pixel units.

The photosensors may comprise at least two photosensors configured to simultaneously detect the laser light radiated to activate the pixel units corresponding to the photosensors.

Each pixel unit may comprise an organic light emitting diode.

Each pixel unit may comprise a liquid crystal layer and a pixel electrode configured to provide a voltage to a liquid crystal.

An exemplary embodiment also discloses a method of operating a display device including pixel units and photosensors, the method including: displaying an image in a display area of the display device; detecting, using the photosensors, a laser light of a laser pointer incident on the display area of the display device; activating a corresponding pixel unit disposed within a indication region to emit light, the indication region is formed by the laser light of the laser pointer radiated onto the display area; determining whether the laser light of the laser pointer is removed; and inactivating the corresponding pixel unit.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
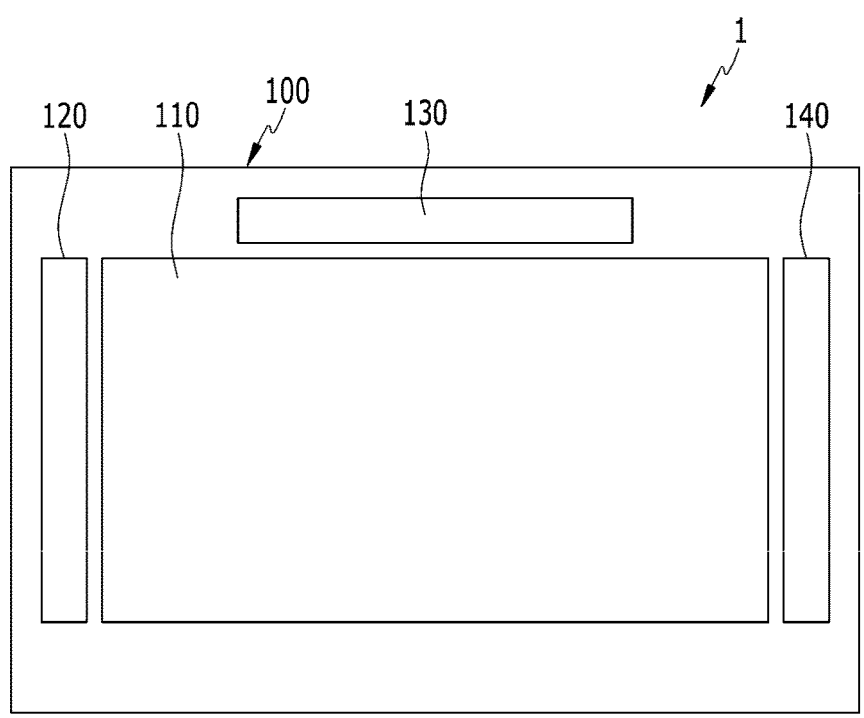
FIG. 1 is a top plan view illustrating a rear surface of a display device according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Hereinafter, display devices according to exemplary embodiments will be described in detail with reference to the accompanying drawings.

Figure 2:
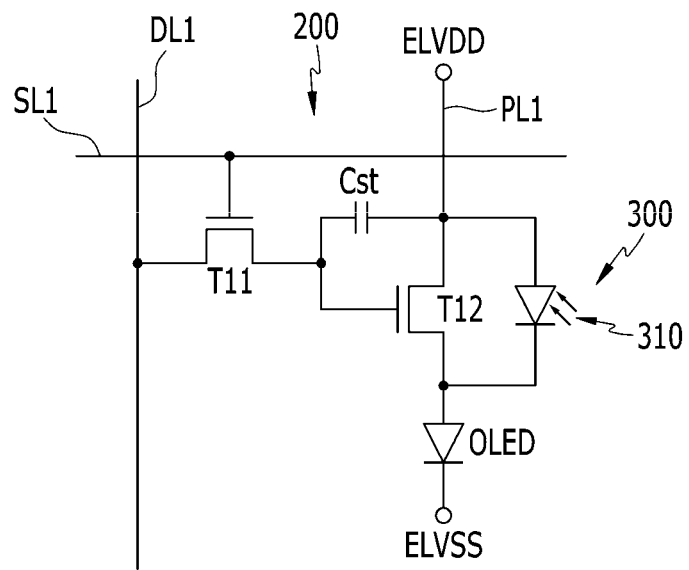
FIG. 2 is a diagram illustrating an equivalent circuit of a pixel unit and a photosensor disposed in the display device of FIG. 1.

FIG. 1 is a top plan view illustrating a rear surface of a display device according to an exemplary embodiment, and FIG. 2 is a diagram illustrating an equivalent circuit of a pixel unit and a photosensor disposed in the display device of FIG. 1.

Referring to FIG. 1 and FIG. 2, a display device 1 according to an exemplary embodiment includes a display substrate 100 that is formed as a flat panel made of a transparent material.

The display substrate 100 includes a display area 110 configured to display an image, the display area including a scan line SL1, a data line DL1, a power line PL1, pixel units 200, and photosensors 300, and a peripheral area disposed surrounding the display area 110, the peripheral area including peripheral circuits 120, 130, and 140. In this case, the peripheral circuits 120, 130, and 140 may respectively supply a scan signal, a data signal, and power to the pixel unit 200, respectively.

The scan line SL1 is disposed extending in a substantially horizontal direction, and the data line DL1 is disposed crossing the scan line DL1, that is, extending in a substantially vertical direction. The power line PL1 is disposed extending in a substantially vertical direction, the power line PL1 including a high potential electrode ELVDD and a low potential electrode ELVSS. The scan line SL1, the data line DL1, and the power line PL1 may be respectively formed in plural and may be insulated from each other.

The pixel unit 200 is configured to receive signals and power respectively from the scan line SL1, the data line DL1, and the power line PL1 to display an image. The pixel unit 200 is disposed where the scan line SL1 and the data line DL1 intersect each other. The pixel unit 200 includes a first switching element T11, a second switching element T12, a storage capacitor Cst, and a light emitting element OLED.

A gate electrode of the first switching element T11 is connected to the scan line SL1, and a source electrode of the first switching element T11 is connected to the data line DL1. A gate electrode of the second switching element T12 is connected to a drain electrode of the first switching element T11, and a source electrode of the second switching element T11 is connected to the high potential electrode ELVDD of the power line PL1.

The storage capacitor Cst is connected between the gate electrode and the source electrode of the second switching element T12. The storage capacitor Cst charges a signal transferred to the gate electrode of the second switching element T12 and maintains the charged state even after the first switching element T12 is turned off.

The light emitting element OLED is formed of, for example, an organic light emitting diode (OLED). A first electrode of the light emitting element OLED is connected to the drain electrode of the second switching element T12, and a second electrode of the light emitting element OLED is connected to the low potential electrode ELVSS of the power line PL1.

The photosensor 300 is connected to the pixel unit 200. When the laser light of a laser pointer is radiated onto the photosensor 300, the photosensor 300 detects the radiation of laser light and provides a sensor current to the pixel unit 200.

Accordingly, the laser light may have a wavelength range of 400 nm to 1000 nm, which includes a wavelength band from a violet wavelength band to a near-infrared wavelength band. The laser light may have an output power within a range of 1 mW to 300 mW, corresponding to Laser Class 3.

More particularly, the photosensor 300 includes a light sensing unit 310. The light sensing unit 310 may be a photodiode, including a first electrode connected to the power line PL1 and a second electrode connected to the light emitting element OLED.

According to an exemplary embodiment, the light sensing unit 310 is the photodiode, but the exemplary embodiments are not limited thereto, and the light sensing unit 310 may be a phototransistor or a photoresistor which may be turned on in response to detecting the laser light.

The light sensing unit 310 is configured to interrupt the sensor current when the laser light of the laser pointer is not detected, and transmit the sensor current when the laser light is detected.

Therefore, when the photosensor 300 detects the laser light, the sensor current flows from the power line PL1 connected to the first electrode of the light sensing unit 310 to the light emitting element OLED, activating the pixel unit 200 connected with the photosensor 300 regardless of application of the signal from the data line DL1 and the scan line SL1.

Hereinafter, when a laser light is radiates onto the display device 1 according to the present exemplary embodiment, a process of displaying a region indicated by the laser pointer will be described in detail.

Figure 3:
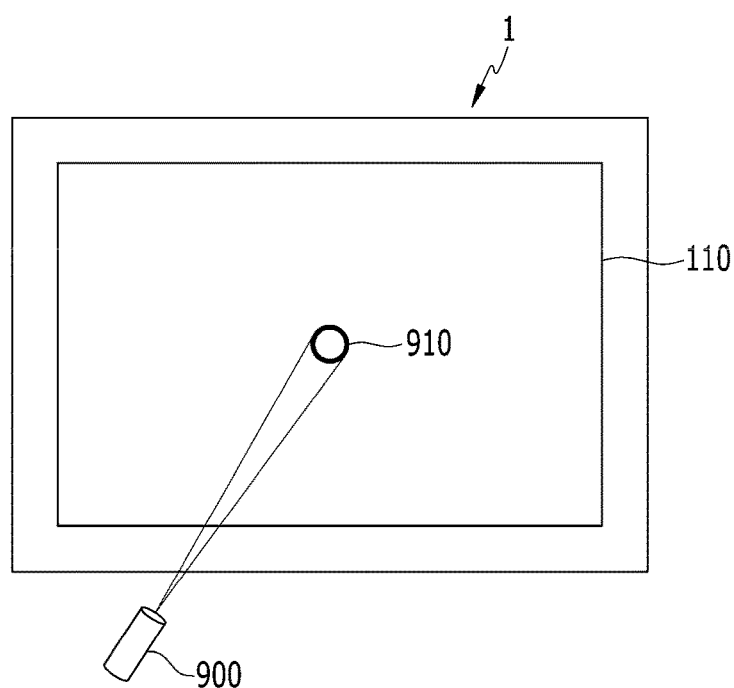
FIG. 3 is a concept diagram illustrating a laser pointer radiating a laser light onto a front surface of the display device of FIG. 1.
Figure 4:
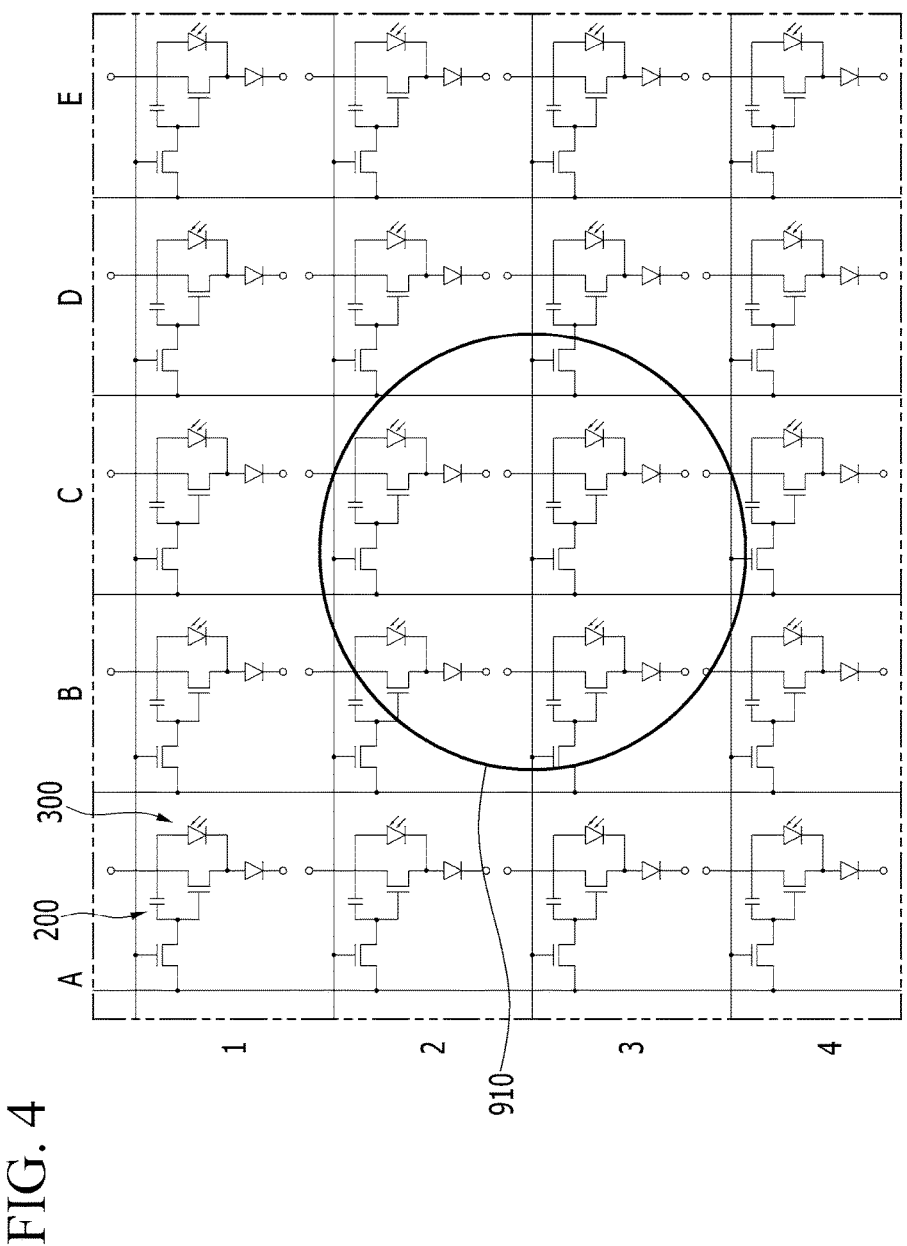
FIG. 4 is a diagram illustrating the laser light radiated onto the pixel unit and the photosensor by the laser pointer of FIG. 3.

FIG. 3 is a concept diagram illustrating a laser pointer radiating a laser light onto a front surface of the display device of FIG. 1, and FIG. 4 is a diagram illustrating the laser light radiated onto the pixel unit and the photosensor by the laser pointer of FIG. 3.

Referring to FIG. 3 and FIG. 4, when a laser pointer 900 radiates a laser light onto the display area 110 of the display device 1, an indication region 910 having a predetermined size is formed in the display area 110.

In the display area 110, the pixel units 200 and the photosensors 300 respective connected to the pixel units 200 are arranged in a matrix form. For example, when the indication region 910 has a circular shape, photosensors 300 disposed in the indication region 910 may detect the laser light of the laser pointer 900.

Referring to FIG. 4, pixels are disposed in matrix form disposed in a first to a fourth row and an A column to an E column. According to an exemplary embodiment, among the photosensors 300, four photosensors disposed in the second and third rows and the B and C columns may detect the laser light.

When the photosensors 300 detects the laser light, four pixel units 200 respectively connected to the photosensors 300 may be activated, so that a part of the display area 110 corresponding to the indication region 910 emits light.

In other words, when the laser light of the laser pointer 900 is radiated onto the indication region, photosensor(s) among the photosensors 300 disposed within the indication region may be activated respective light emitting element(s) OLED of a pixel unit 200 connected with the activated photosensor(s) may be operated, so that the indication region irradiated by the laser light may emit light.

Figure 5:
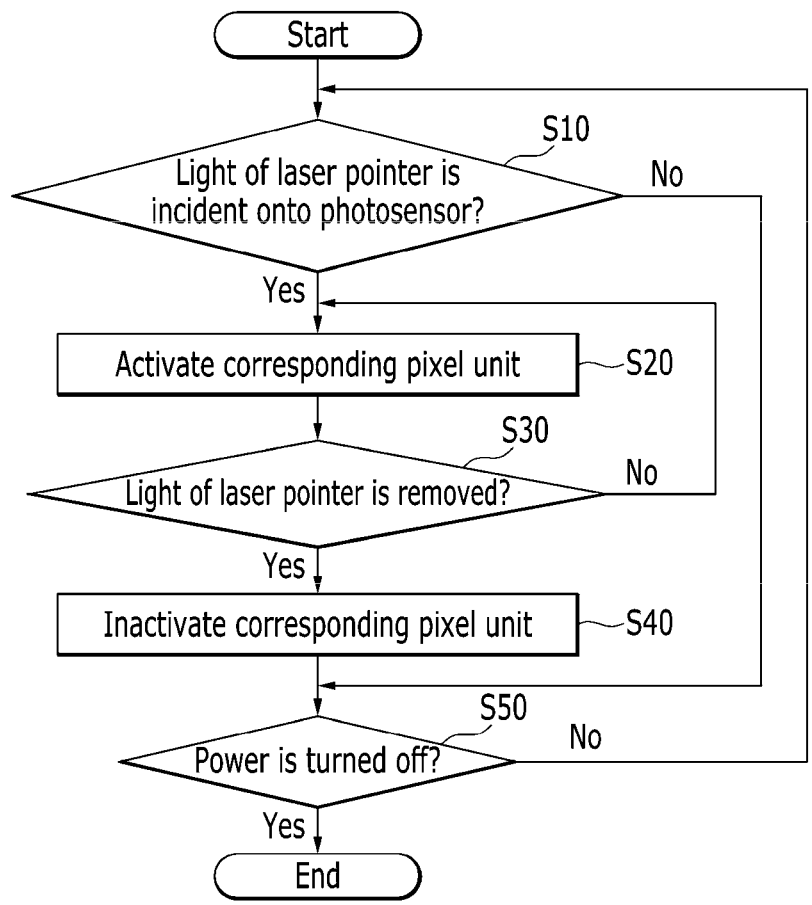
FIG. 5 is a flowchart illustrating a driving method according to an exemplary embodiment of the display device of FIG. 1.

FIG. 5 is a flowchart illustrating a control method according to an exemplary embodiment of the display device of FIG. 1. Referring to FIG. 5, the photosensor 300 monitors whether a laser light of the laser pointer 900 is incident (S10).

When the laser light of the laser pointer 900 is incident onto any corresponding photosensor in the indication region among the photosensors 300, the corresponding photosensor activates a corresponding pixel unit in the indication region among the pixel units 200 (S20). In other words, the corresponding photosensor transmits a sensor current to the corresponding pixel unit.

When the corresponding pixel unit 200 is activated, the indication region 910, onto which the laser light of the laser pointer 900 is radiated, emits light, so that a user may clearly recognize the indication region 910.

Then, the corresponding photosensor determines whether the laser light of the laser pointer 900 is removed (S30). If the light is removed, the corresponding photosensor inactivates the corresponding pixel unit 200 (S40).

Then, it is determined whether the power of the display device 1 is turned off (S50), and if the power is turned off, control is terminated.

According to an exemplary embodiment, the display area 110 corresponding to the indication region 910 radiated by the laser light from the laser pointer 900 directly emits light, so that the indication region 910 may be clearly recognized from the outside of the display device 1.

Figure 6:
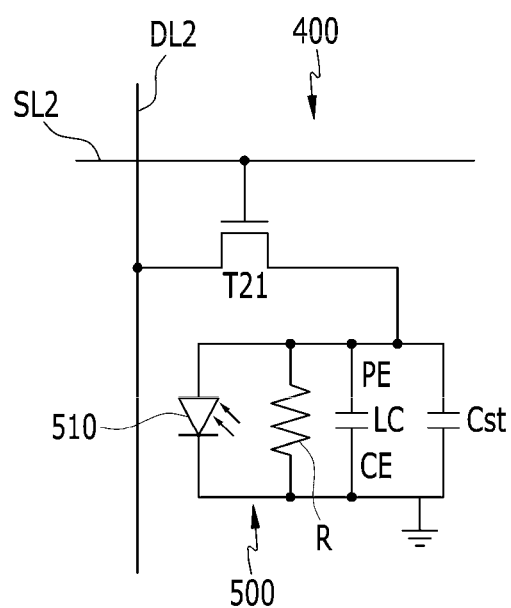
FIG. 6 is a diagram illustrating an equivalent circuit of a pixel unit and a photosensor of a display device according to an exemplary embodiment.

FIG. 6 is a diagram illustrating an equivalent circuit of a pixel unit and a photosensor of a display device according to an exemplary embodiment. According to an exemplary embodiment, some components of the display device including a pixel unit and a photosensor are different from those of the display device of FIGS. 1 to 5. Therefore, the different components of the present exemplary embodiment will be mainly described hereinafter, and the other components are substantially the same as those of the display device of FIGS. 1 to 5 may be omitted.

Referring to FIG. 6, a pixel unit 400 according to an exemplary embodiment includes a switching element T21, a liquid crystal layer LC, a pixel electrode PE, a common electrode CE, and a storage capacitor Cst. A gate electrode of the switching element T21 is connected to a scan line SL2, and a source electrode of the switching element T21 is connected to a data line DL2.

The pixel electrode PE, which applies a voltage to a liquid crystal layer LC, is connected to a drain electrode of the switching element T21, and both electrodes of the storage capacitor Cst are respectively connected to the pixel electrode PE and the common electrode CE. A common voltage may be applied to the common electrode.

The display device according to an exemplary embodiment is formed as a liquid crystal display (LCD), and further includes a backlight unit (BLU) disposed at the rear of a display substrate to provide light.

a first electrode of a photosensor 500, an anode for example, is connected to the pixel electrode PE, and a second electrode of the photosensor 500, a cathode for example, is connected to the common electrode CE.

The photosensor 500 includes a light sensing unit 510, which detects a laser light and generates a sensor current when the laser light is incident from the laser pointer onto the photosensor 50, and a resistance unit R connected parallel to the light sensing unit 510. Both ends of the resistance unit R are respectively connected to the pixel electrode PE and the common electrode CE.

The light sensing unit 510 according to an exemplary embodiment is formed of a photodiode, and when the laser light is incident, generates a sensor current according to illuminance of the light.

When the light sensing unit 510 generates the current by the incidence laser light of the laser pointer, a sensor voltage having a preset magnitude is generated across the resistance unit R connected parallel to the light sensing unit 510, and the photosensor 500 may apply the sensor voltage.

In other words, when the photosensor 500 detects the laser light, the photosensor 500 generates the sensor voltage having the preset magnitude and applies the sensor voltage to the pixel electrode PE connected with the photosensor 500.

When the sensor voltage is provided to the pixel electrode PE, the corresponding pixel unit 400 is activated, so the indication region, onto which the laser light of the laser pointer is incident, may emit light.

Figure 7:
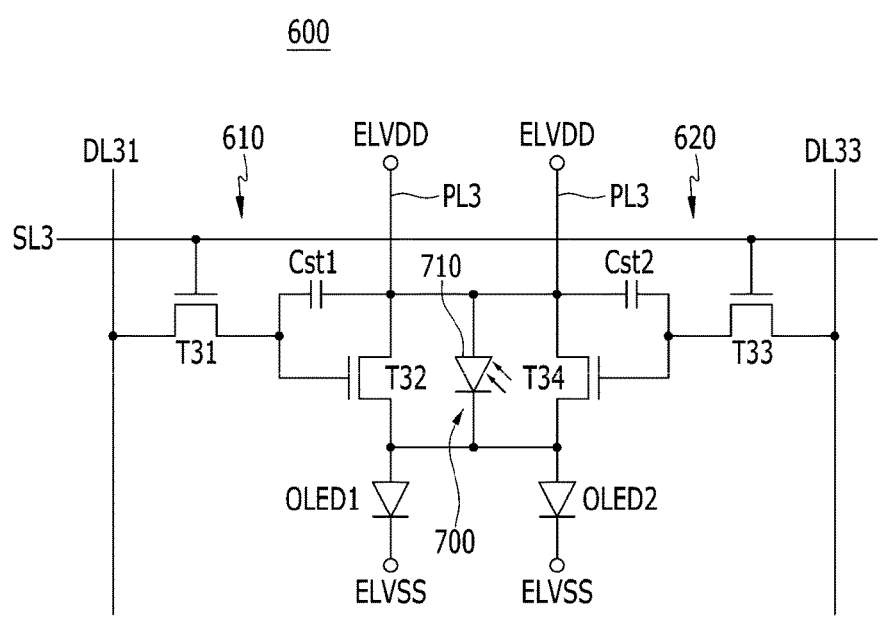
FIG. 7 is a diagram illustrating an equivalent circuit of a pixel unit and a photosensor of a display device according to an exemplary embodiment.

FIG. 7 is a diagram illustrating an equivalent circuit of a pixel unit and a photosensor of a display device according to an exemplary embodiment.

According to an exemplary embodiment, some components of the display device including a pixel unit and a photosensor are different from those of the display device of FIGS. 1 to 5. Therefore, the different components of the present exemplary embodiment will be mainly described hereinafter, and the other components are substantially the same as those of the display device of FIGS. 1 to 5 may be omitted.

Referring to FIG. 7, a display device 600 according to an exemplary embodiment includes a first pixel unit 610 and a second pixel unit 620, and a photosensor 700 connected to the first pixel unit 610 and the second pixel unit 620.

The first pixel unit 610 includes a first switching element T31, a first storage capacitor Cst1, a second switching element T32, and a first light emitting element OLED1.

Similarly, the second pixel unit 620 includes a third switching element T33, a second storage capacitor Cst2, a fourth switching element T34, and a second light emitting element OLED2.

The photosensor 700 includes a light sensing unit 710 including a first electrode connected to a high potential electrode ELVDD of a power line PL3, and a second electrode connected to the first light emitting element OLED1 and the second light emitting element OLED2. In other words, the photosensor 700 is connected to both of the adjacent pixel units 610 and 620.

Accordingly, when the photosensor 700 detects the laser light of the laser pointer, the photosensor 700 activates the first pixel unit 610 and the second pixel unit 620 simultaneously, so the indication region indicated by the laser pointer may emit light.

According to an exemplary embodiment, the indication region indicated by the laser pointer may be further widened, so the user may recognize the indication region more easily.

According to the display devices according to an exemplary embodiment, a part of a display area corresponding to an indication region indicated by a laser pointer may emit light, so that a user may clearly recognize the indication region.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A display device comprising:
a display panel comprising a display area;
scan lines disposed on the display panel;
data lines disposed on the display panel, the data lines crossing the scan lines while being insulated from the scan lines;
pixel units disposed in the display area and positioned near a point where the scan line intersects the data line;
a power line configured to provide a current to the pixel units; and
photosensors respectively connected to the pixel units, each photosensor configured to activate a respective pixel unit when laser light is incident on the photosensor,
wherein each pixel unit comprises:
a first switching element comprising a gate electrode connected to the scan line, a source electrode, and a drain electrode;
a second switching element comprising a gate electrode, a source electrode, and a drain electrode; and
a light emitting element,
wherein each photosensor comprises a light sensing unit configured to transmit a sensor current in response to detecting the laser light,
wherein the light sensing unit comprises a first electrode connected to the power line and a second electrode connected to the light emitting element,
wherein the source electrode and the drain electrode of the first switching element are respectively connected to the data line and the gate electrode of the second switching element, and
wherein the source electrode and the drain electrode of the second switching element are respectively connected to the power line and the light emitting element.

2. The display device of claim 1,
wherein the light sensing unit comprises any one selected from the group consisting of a photoresistor, a photodiode, and a phototransistor.

3. The display device of claim 1, wherein the photosensors comprise at least one photosensor connected to two adjacent pixel units.

4. The display device of claim 1, wherein the photosensors comprise at least two photosensors configured to simultaneously detect the laser light radiated to activate the pixel units corresponding to the photosensors.

5. The display device of claim 1, wherein:
each pixel unit comprises an organic light emitting diode.

6. The display device of claim 1, wherein:
each pixel unit comprises a liquid crystal layer and a pixel electrode configured to provide a voltage to a liquid crystal.

7. A display device comprising:
a display panel comprising a display area;
scan lines disposed on the display panel;
data lines disposed on the display panel, the data lines crossing the scan lines while being insulated from the scan lines;
pixel units disposed in the display area and positioned near a point where the scan line intersects the data line; and
photosensors respectively connected to the pixel units, each photosensor configured to activate a respective pixel unit when laser light is incident on the photosensor, device of claim 1, wherein:
wherein the pixel unit comprises:
 a switching element comprising a gate electrode connected to the scan line, a source electrode, and a drain electrode is connected to the data line;
 a pixel electrode; and
 a common electrode,
wherein the photosensor comprises a resistance unit,
wherein the resistance unit of the photosensor is connected between the pixel electrode and the common electrode, and
wherein the source electrode and the drain electrode of the switching element are respectively connected to the data line and the pixel electrode of the pixel electrode.

8. The display device of claim 7, wherein the photosensor further comprises:
a light sensing unit configured to generate a sensor current in response to detecting the laser light is incident, and
wherein the resistance unit is connected in parallel to the light sensing unit.

9. The display device of claim 8, wherein the light sensing unit comprises any one selected from the group consisting of a photoresistor, a photodiode, and a phototransistor.

* * * * *